(12) United States Patent
Fujishiro et al.

(10) Patent No.: US 10,326,548 B2
(45) Date of Patent: Jun. 18, 2019

(54) BASE STATION, USER TERMINAL, PROCESSOR, AND COMMUNICATION METHOD

(71) Applicant: KYOCERA CORPORATION, Kyoto (JP)

(72) Inventors: Masato Fujishiro, Yokohama (JP); Chiharu Yamazaki, Tokyo (JP); Hiroyuki Urabayashi, Yokohama (JP); Noriyoshi Fukuta, Tokyo (JP); Naohisa Matsumoto, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 23 days.

(21) Appl. No.: 15/811,857

(22) Filed: Nov. 14, 2017

(65) Prior Publication Data
US 2018/0069653 A1     Mar. 8, 2018

Related U.S. Application Data

(63) Continuation of application No. PCT/JP2016/063889, filed on May 10, 2016.
(Continued)

(51) Int. Cl.
| | |
|---|---|
| *H04L 1/00* | (2006.01) |
| *H04W 16/14* | (2009.01) |
| *H04L 5/00* | (2006.01) |
| *H04W 72/04* | (2009.01) |
| *H04W 72/12* | (2009.01) |

(52) U.S. Cl.
CPC .......... *H04L 1/0004* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS

| | | | |
|---|---|---|---|
| 2015/0223075 A1* | 8/2015 | Bashar | H04W 16/14 370/329 |
| 2016/0105907 A1* | 4/2016 | Lee | H04W 16/14 370/336 |

(Continued)

OTHER PUBLICATIONS

International Search Report issued in PCT/JP2016/063889; dated Aug. 2, 2016.
(Continued)

*Primary Examiner* — Brian S Roberts
(74) *Attorney, Agent, or Firm* — Studebaker & Brackett PC

(57) ABSTRACT

A base station according to an embodiment is a base station configured to perform transmission to a user terminal by use of an unlicensed band. The base station comprises: a controller configured to start the transmission from a boundary of a subframe, but also to start the data transmission from a second-half slot out of a first-half slot and the second-half slot which configure a subframe. The controller is configured to transmit downlink control information in the second-half slot to start the transmission from the second-half slot. The controller is configured to change a modulation scheme to be applied to the transmission, depending on a start timing of the transmission, while fixing a transport block size applied to the subframe. The downlink control information is a PDCCH or an EPDCCH.

14 Claims, 13 Drawing Sheets

Related U.S. Application Data

(60) Provisional application No. 62/165,315, filed on May 22, 2015, provisional application No. 62/162,231, filed on May 15, 2015.

(52) U.S. Cl.
CPC .......... *H04L 1/0015* (2013.01); *H04L 1/0027* (2013.01); *H04L 5/0053* (2013.01); *H04W 16/14* (2013.01); *H04W 72/042* (2013.01); *H04W 72/12* (2013.01)

(56) References Cited

U.S. PATENT DOCUMENTS

| | | | |
|---|---|---|---|
| 2016/0127098 A1* | 5/2016 | Ng .................. | H04L 5/0048 370/329 |
| 2016/0182204 A1* | 6/2016 | Hsieh ................ | H04L 5/0055 370/329 |

OTHER PUBLICATIONS

Intel Corporation; Frame structure and (e)PDCCH for LAA downlink; 3GPP TSG RAN WG1 Meeting #80-BIS; R1-151826; Apr. 20-24, 2015; pp. 1-7; Belgrade, Serbia.

NVIDIA; Design of LBE-based LAA downlink; 3GPP TSG-RAN WG1 Ad-hoc Meeting; R1-151065; Mar. 24-26, 2015; pp. 1-6; Paris, France.

Nokia Networks; On data transmission in partial subframe for LBE type of operation; 3GPP TSG-RAN WG1 Meeting 181; R1-152824; May 25-29, 2015; pp. 1-7; Fukuoka, Japan.

\* cited by examiner

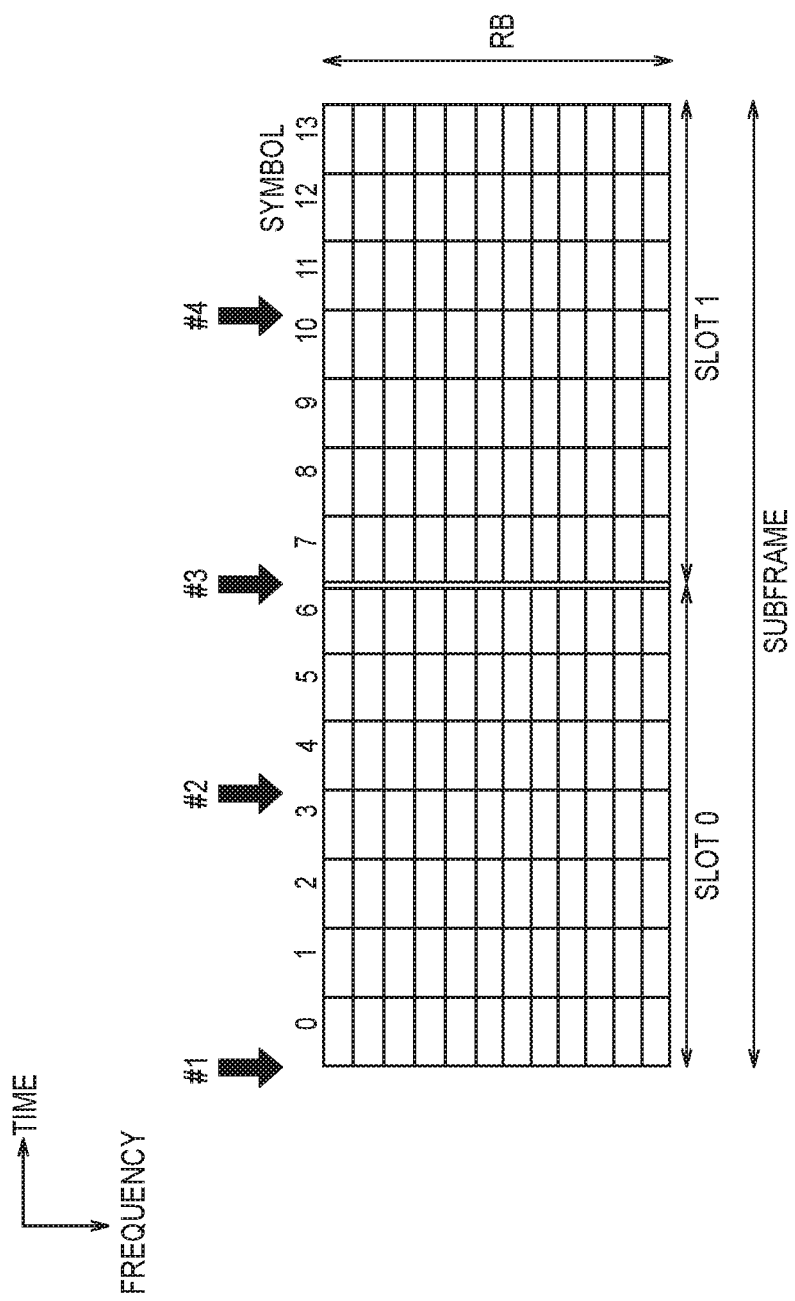

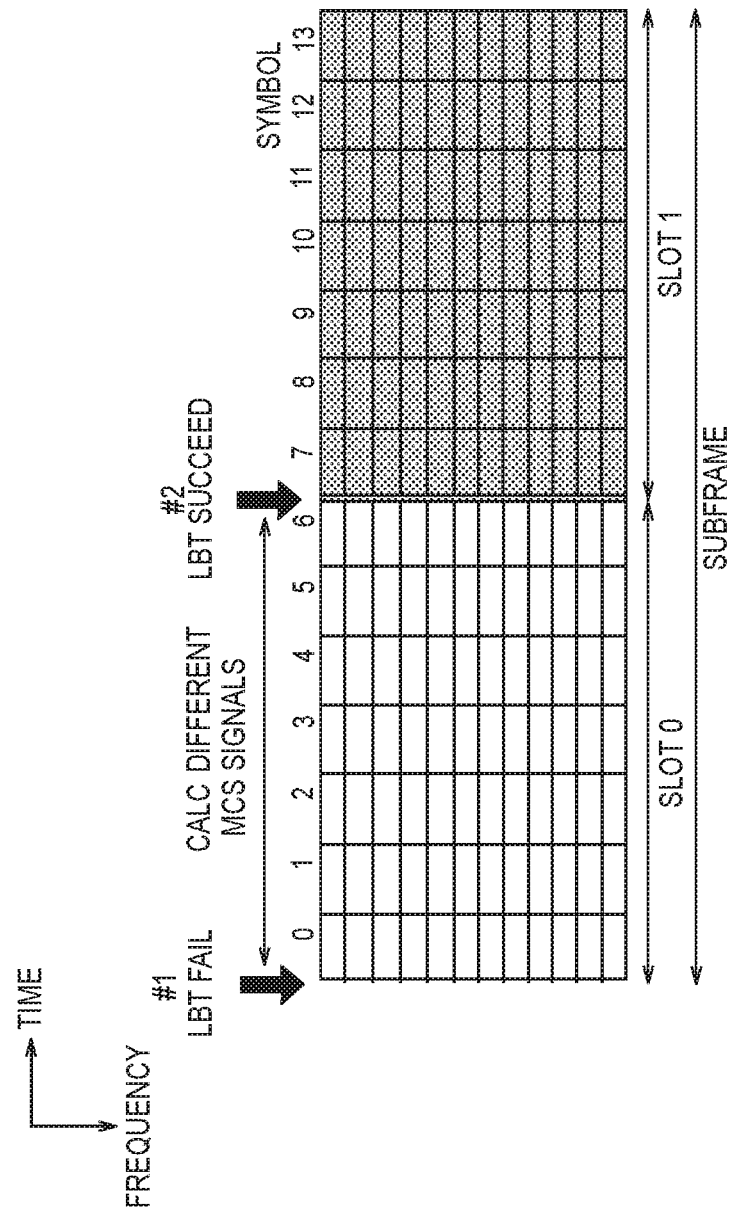

US 10,326,548 B2

BASE STATION, USER TERMINAL, PROCESSOR, AND COMMUNICATION METHOD

RELATED APPLICATIONS

This application is a continuation application of international application PCT/JP2016/063889, filed May 10, 2016, which claims benefit of U.S. Provisional Application No. 62/162,231, filed May 15, 2015 and U.S. Provisional Application No. 62/165,315, filed May 22, 2015, the entirety of all applications hereby expressly incorporated by reference.

TECHNICAL FIELD

The present application relates to a base station and a user terminal used in a mobile communication system.

BACKGROUND ART

In 3GPP (3rd Generation Partnership Project), which is a project aiming to standardize a mobile communication system, attempts are being made to enhance LTE (Long Term Evolution) to comply with rapidly increasing traffic demands. As one of such attempts, it has been discussed to use, for LTE communication, not only a frequency band for which a license is granted to an operator (licensed band) but also a frequency band for which a license is not required (unlicensed band).

In the unlicensed band, in order to avoid interference with another system different from an LTE system (such as wireless LAN) or an LTE system of another operator, a listen-before-talk (LBT) procedure is requested. The LBT procedure is a procedure to monitor a frequency in the unlicensed band to check, based on a received power (interference power), whether or not the frequency is available, and only if the frequency is confirmed to be available (clear channel), the frequency is used.

SUMMARY

A base station according to an embodiment is a base station configured to perform transmission to a user terminal by use of an unlicensed band. The base station comprises: a controller configured to start the transmission from a boundary of a subframe, but also to start the data transmission from a second-half slot out of a first-half slot and the second-half slot which configure a subframe. The controller is configured to transmit downlink control information in the second-half slot to start the transmission from the second-half slot. The controller is configured to change a modulation scheme to be applied to the transmission, depending on a start timing of the transmission, while fixing a transport block size applied to the subframe. The downlink control information is a PDCCH or an EPDCCH.

A user terminal according to an embodiment is a user terminal configured to perform reception from a base station by use of an unlicensed band. The use terminal comprises: a controller configured to starting the reception from a second-half slot out of a first-half slot and the second-half slot which configure a subframe. The controller is configured to monitor downlink control information in the second-half slot to start the reception from the second-half slot. The controller is configured to change a modulation scheme to be applied to the reception, depending on a start timing of the reception, while fixing a transport block size applied to the subframe. The downlink control information is a PDCCH or an EPDCCH.

A processor according to an embodiment is a processor for controlling a base station configured to perform reception from a base station by use of an unlicensed band. The processor comprises: a memory communicatively coupled to the processor and including instructions, such that when executed by the processor performs the processes of: starting the reception from a second-half slot out of a first-half slot and the second-half slot which configure a subframe; monitoring downlink control information in the second-half slot to start the reception from the second-half slot; and changing a modulation scheme to be applied to the reception, depending on a start timing of the reception, while fixing a transport block size applied to the subframe. The downlink control information is a PDCCH or an EPDCCH.

A communication method according to an embodiment comprises: transmitting, by a base station configured to perform transmission to a user terminal by use of an unlicensed band, downlink control information in a second-half slot out of a first-half slot and the second-half slot which configure a subframe to start the transmission from the second-half slot; monitoring, by the user terminal configured to perform reception from the base station by use of the unlicensed band, the downlink control information in the second-half slot to start the reception from the second-half slot; changing, by the base station, a modulation scheme to be applied to the transmission, depending on a start timing of the transmission, while fixing a transport block size applied to the subframe; and changing, by the user terminal, a modulation scheme to be applied to the reception, depending on a start timing of the reception, while fixing a transport block size applied to the subframe. The downlink control information is a PDCCH or an EPDCCH.

BRIEF DESCRIPTION OF DRAWINGS

FIG. 8 is a diagram illustrating an example of a data transmission timing of a downlink according to a first embodiment.

FIG. 9 is a diagram for describing an operation pattern 2 according to the first embodiment.

DESCRIPTION OF EMBODIMENTS

Overview of Embodiment

Figure 1:
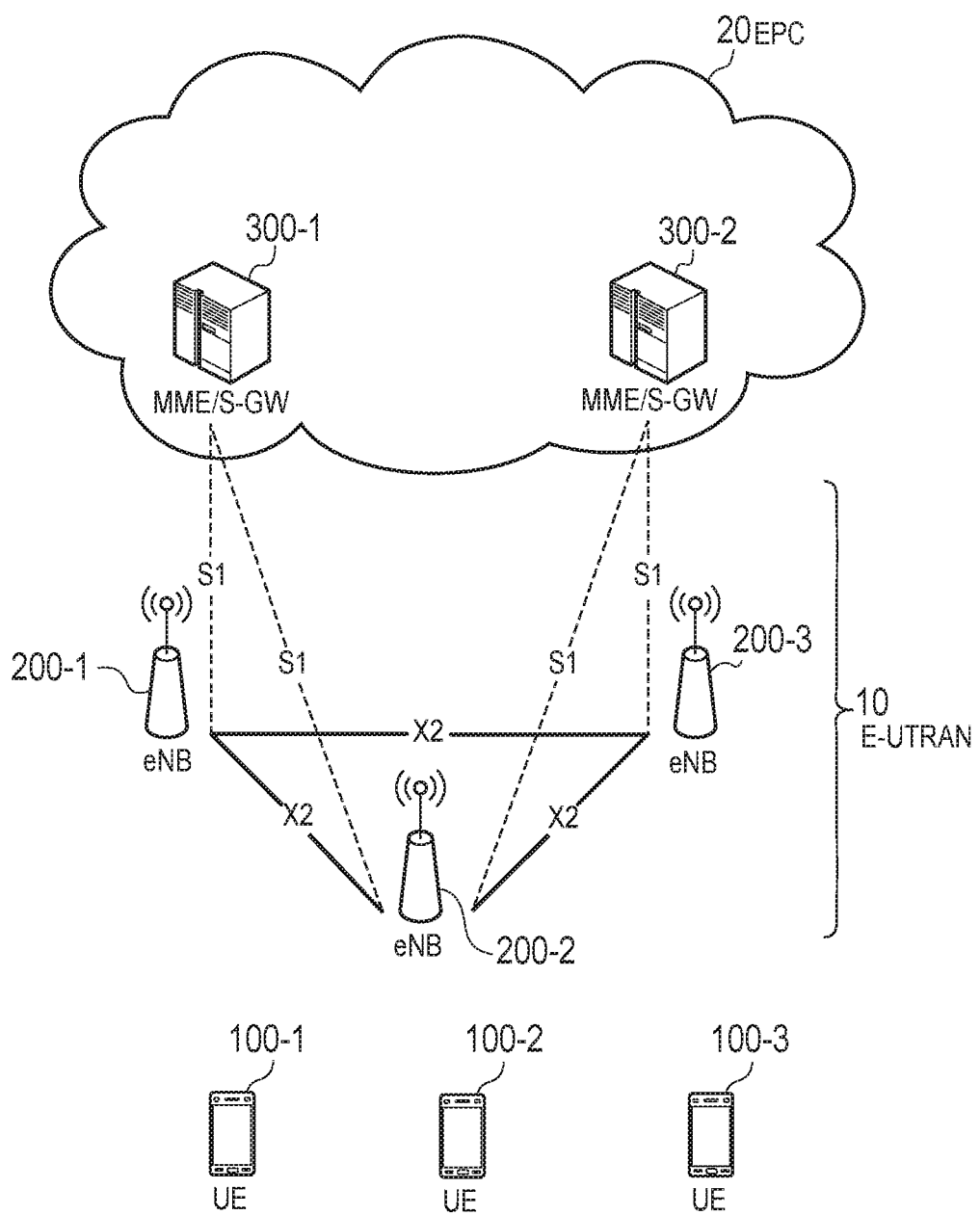
FIG. 1 is a diagram illustrating a configuration of an LTE system.

A base station according to a first embodiment performs data transmission to a user terminal by use of an unlicensed band. The base station comprises a controller configured to determine a transmission parameter to be applied to the data transmission in a subframe in response to a start timing of the data transmission in the subframe if starting the data transmission from anywhere across the subframe in response to an monitoring result of the unlicensed band. The transmission parameter includes at least one of a transport block size, a modulation and coding scheme, a modulation scheme, and the number of resource blocks.

In a first embodiment, the controller applies, to the data transmission, a second transmission parameter different from a first transmission parameter applied when performing the data transmission from the beginning of the subframe, if starting the data transmission from anywhere across the subframe.

In a first embodiment, the subframe is set with a plurality of candidate timings at which the data transmission can be started. The controller applies different transmission parameters for each of the plurality of candidate timings to generate the transmission data.

In a first embodiment, the controller applies different transmission parameters for each of the plurality of candidate timings to generate transmission data in advance, and maintains the generated transmission data in advance.

In a first embodiment, if determining that the data transmission is not possible for one candidate timing out of a plurality of candidate timings, the controller generates transmission data corresponding to one subsequent candidate timing after the one candidate timing, after the determination.

In a first embodiment and a third embodiment, the controller notifies the user terminal of transmission parameters of each of the plurality of candidate timings by use of a licensed band.

In a first embodiment, the controller fixes the modulation and coding scheme applied to the subframe while changing the transport block size applied to the data transmission in response to the start timing of the data transmission in the subframe.

In a first embodiment, the controller fixes the transport block size applied to the subframe while changing the modulation scheme applied to the data transmission in response to the start timing of the data transmission in the subframe.

In a first embodiment and a third embodiment, if starting the data transmission from anywhere across the subframe, the controller performs a process of transmitting, at the head of the data, a specific signal different from the data transmitted to the user terminal. The specific signal includes at least one of a synchronization signal and downlink control information.

A base station according to a second embodiment performs data transmission to a user terminal in a burst transmission period over a plurality of subframes by use of the unlicensed band. The base station comprises a controller configured to transmit, in a final subframe of the burst transmission period, data that cannot be completely transmitted in a subframe, if starting the data transmission from anywhere across the subframe in response to a monitoring result of the unlicensed band.

A user terminal according to a second embodiment performs data reception from a base station in a burst transmission period over the plurality of subframes by use of a unlicensed band. The user terminal comprises a controller configured to receive, in a final subframe of the burst transmission period, data that cannot be completely received in a subframe, if starting the data reception in anywhere across the subframe in response to the monitoring result of the unlicensed band in the base station.

A user terminal according to a third embodiment performs data reception from a base station by use of an unlicensed band. The user terminal comprises a receiver configured to receive, at the head of the data, a specific signal different from data, if starting the data reception from anywhere across subframe. The specific signal includes at least one of a synchronization signal and downlink control information.

A user terminal according to a third embodiment performs data reception from a base station by use of an unlicensed band. The user terminal comprises: a receiver configured to receive downlink control information from the base station; and a controller configured to modify the downlink control information in response to the start timing of the data reception in the subframe, and use the modified downlink control information for the data reception.

A base station according to a fourth embodiment performs data transmission to a user terminal by use of an unlicensed band. The base station comprises a controller configured to determine whether or not the data transmission can be started, in response to a monitoring result of the unlicensed band. If a timing for determining that the data transmission can be started is in anywhere across a symbol interval, the controller starts the data transmission from the timing in anywhere across the symbol interval, without waiting for a head of a next symbol interval.

A user terminal according to a fourth embodiment performs data reception from a base station by use of an unlicensed band. The user terminal comprises: a receiver configured to receive, from the base station, candidate timing information indicating a symbol interval with a possibility that the base station starts data transmission; and a controller configured to perform a process of starting the data reception in the symbol interval indicated by the candidate timing information.

Mobile Communication System

An LTE system, which is a mobile communication system according to an embodiment will be described below.

System Configuration

FIG. 1 is a diagram illustrating a configuration of the LTE system. As illustrated in FIG. 1, the LTE system includes a UE (User Equipment) 100, an E-UTRAN (Evolved-UMTS Terrestrial Radio Access Network) 10, and an EPC (Evolved Packet Core) 20.

The UE 100 corresponds to a user terminal. The UE 100 is a mobile communication device, which performs radio communication with a cell (a serving cell). The configuration of the UE 100 will be described later.

The E-UTRAN 10 corresponds to a radio access network. The E-UTRAN 10 includes an eNB 200 (evolved Node-B). The eNB 200 corresponds to a base station. The eNBs 200 are connected mutually via an X2 interface. The configuration of the eNB 200 will be described later.

The eNB 200 manages one cell or a plurality of cells, and performs radio communication with the UE 100 which has established a connection with a cell of the eNB 200. The eNB 200 has a radio resource management (RRM) function, a routing function of user data (hereinafter, simply called the "data"), a measurement control function for mobility control and scheduling, and the like. The "cell" is used as a term indicating a smallest unit of a radio communication area, and is also used as a term indicating a function of performing radio communication with the UE 100.

The EPC 20 corresponds to a core network. The EPC 20 includes an MME (Mobility Management Entity)/S-GW (Serving-Gateway) 300. The MME performs different types of mobility control and the like for the UE 100. The S-GW performs transfer control of the data. The MME/S-GW 300 is connected to the eNB 200 via an S1 interface. The E-UTRAN 10 and the EPC 20 constitute a network.

Figure 2:
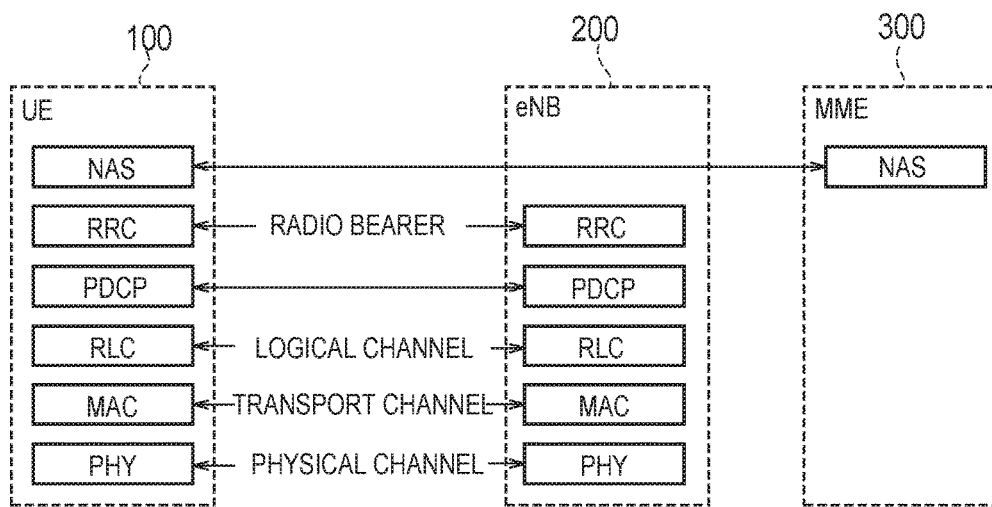
FIG. 2 is a protocol stack diagram of a radio interface in the LTE system.

FIG. 2 is a protocol stack diagram of a radio interface in the LTE system. As illustrated in FIG. 2, a radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, data and control signals are transmitted via a transport channel. The MAC layer of the eNB 200 includes a scheduler for determining a transport format (a transport block size and a modulation and coding scheme (MCS)) of an uplink and a downlink, and an allocation resource block for the UE 100.

The RLC layer uses functions of the MAC layer and the physical layer to transmit data to the RLC layer of a reception side. Between the RLC layer of the UE 100 and the RLC layer of the eNB 200, data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a message (RRC message) for various types of settings is transmitted. The RRC layer controls the logical channel, the transport channel, and the physical channel in response to the establishment, re-establishment, and release of a radio bearer. When there is a connection (an RRC connection) between the RRC of the UE 100 and the RRC of the eNB 200, the UE 100 is in an RRC connected state, and otherwise, the UE 100 is in an RRC idle state.

An NAS (Non-Access Stratum) layer positioned above the RRC layer performs session management, mobility management and the like.

Figure 3:
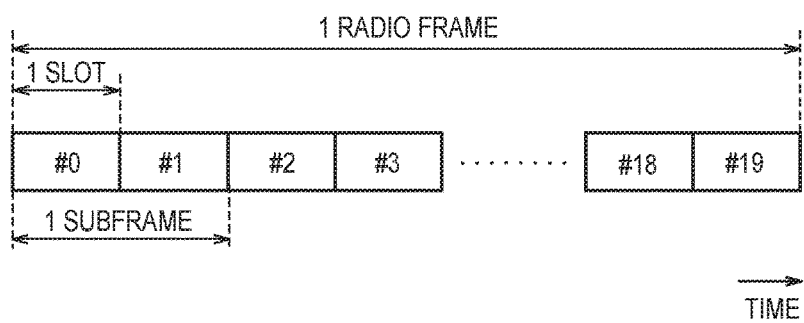
FIG. 3 is a configuration diagram of a radio frame used in the LTE system.

FIG. 3 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 3, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. One resource element (RE) is configured by one symbol and one subcarrier. Furthermore, of the radio resources (time-frequency resources) allocated to the UE 100, it is possible to designate a frequency resource by a resource block, and designate a time resource by a subframe (or a slot).

In the downlink, an interval of several symbols at a head of each subframe is a region used as a physical downlink control channel (PDCCH) for mainly transmitting a downlink control signal. The PDCCH will be described in detail later. Furthermore, the remaining portion of each subframe is a region available as a physical downlink shared channel (PDSCH) for mainly transmitting downlink data.

In the uplink, both ends in the frequency direction of each subframe are regions used as a physical uplink control channel (PUCCH) for mainly transmitting an uplink control signal. The remaining portion of each subframe is a region available as a physical uplink shared channel (PUSCH) for mainly transmitting uplink data.

Unlicensed Band

The LTE system according to the embodiment uses, for LTE communication, not only a licensed band for which the license is granted to operators, but also an unlicensed band for which the license is not required. Specifically, with an aid of the licensed band, it is possible to access the unlicensed band. Such mechanism is referred to as a licensed-assisted access (LAA).

Figure 4:
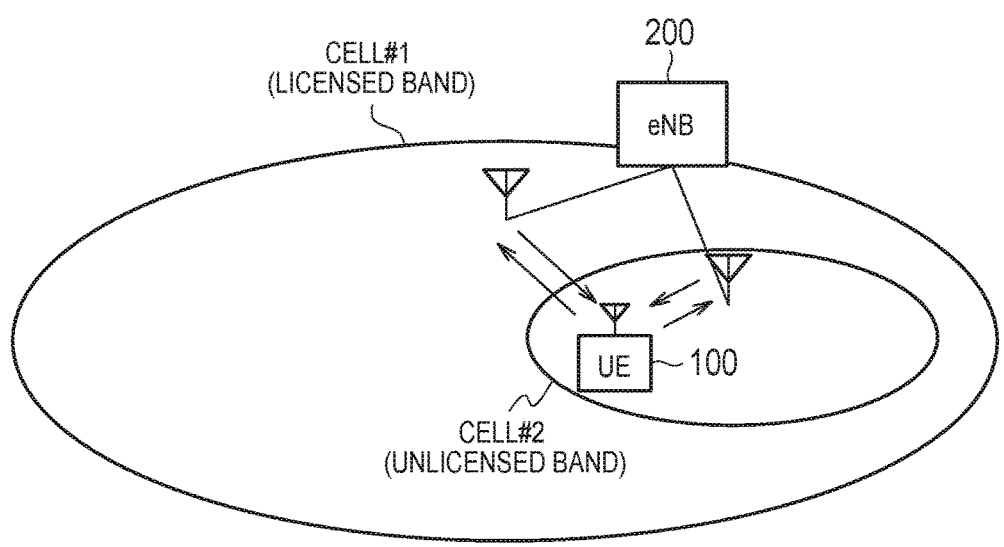
FIG. 4 is a diagram for describing an LAA.

FIG. 4 is a diagram for describing the LAA. As illustrated in FIG. 4, the eNB 200 manages a cell #1 operated in the licensed band and a cell #2 operated in the unlicensed band. In FIG. 4, an example is illustrated where the cell #1 is a macro cell and the cell #2 is a small cell, but a cell size is not limited to this.

The UE 100 is located in an overlapping area of the cell #1 and the cell #2. The UE 100 sets the cell #1 as a primary cell (PCell), while setting the cell #2 as a secondary cell (SCell) and performs communication by carrier aggregation (CA).

In the example of FIG. 4, the UE 100 performs uplink communication and downlink communication with the cell #1, and performs uplink communication and downlink communication with the cell #2. By such carrier aggregation, the UE 100 is provided with, in addition to a radio resource of the licensed band, a radio resource of the unlicensed band, and thus, the UE 100 can improve a throughput. For downlink control information (DCI) such as the resource allocation information in the unlicensed band, the eNB 200 notifies the UE 100 of the information via the licensed band, or notifies the UE 100 of the information via the unlicensed band.

In the embodiment, downlink communication in the cell #2 (unlicensed band) will be mainly described.

LBT

In the unlicensed band, in order to avoid interference with another system different from the LTE system (such as wireless LAN) or an LTE system of another operator, the LBT procedure is requested. There are two schemes of the LBT, a frame based equipment (FBE) scheme and a load based equipment (LBE) scheme. The FBE scheme is a scheme in which a timing is fixed. Meanwhile, the timing is not fixed in the LBE scheme.

Figure 5:
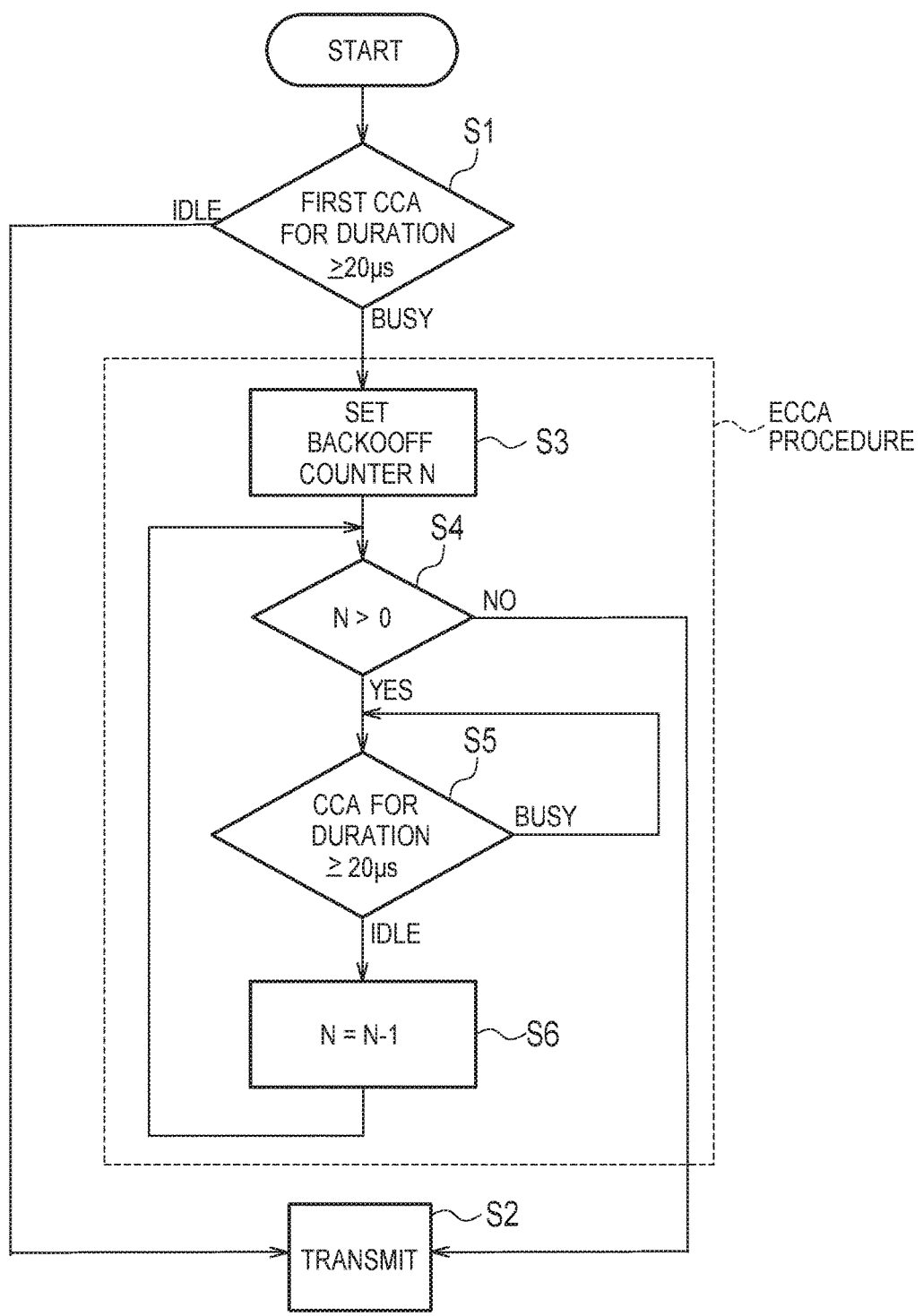
FIG. 5 is a flow chart illustrating an example of LBT of an LBE scheme.

In the embodiment below, a case is assumed where the LBE scheme is applied to the downlink communication in the unlicensed band. FIG. 5 is a flow chart illustrating an example of the LBT of the LBE scheme. The eNB 200 executes the present flow for a target frequency (target carrier) in the unlicensed band.

As illustrated in FIG. 5, the eNB 200 monitors the target frequency and determines, based on a received power (interference power), whether or not the target frequency is available (step S1). Such determination is referred to as a clear channel assessment (CCA). Specifically, if a state where the detected power is larger than a threshold value continues for a constant period (for example, 20 μs or more), the eNB 200 determines that the target frequency is in use (Busy). Otherwise, the eNB 200 determines that the target frequency is available (Idle), and uses the target frequency to transmit downlink data to the UE 100 (step S2).

As a result of such an initial CCA, if the target frequency is determined to be in use (Busy), the eNB 200 moves to an extended clear channel assessment (ECCA) process. In the ECCA process, the eNB 200 sets a counter (N) where an initial value is N (step S3). N is a random number from 4 to 32. The UE 100 decrements N (that is, subtracts 1) each time the CCA is successful (steps S5 and S6). Upon N reaching zero (step S4: No), the eNB 200 determines that the target frequency is available (Idle), and uses the target frequency to transmit downlink data to the UE 100 (step S2).

User Terminal

Figure 6:
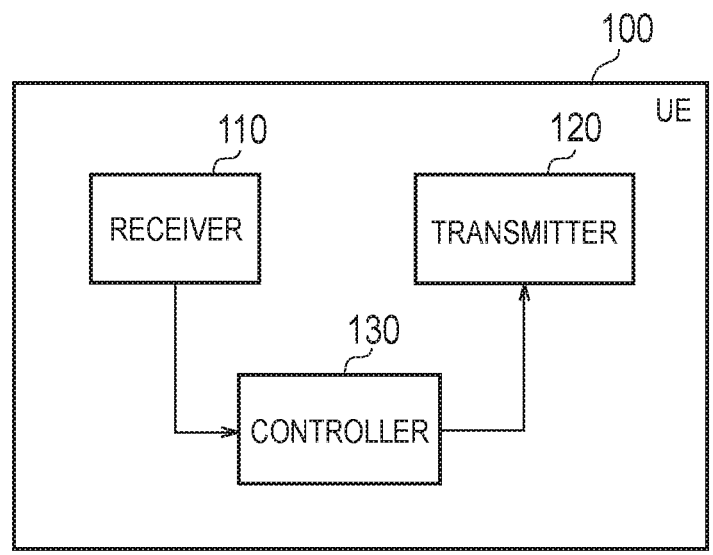
FIG. 6 is a block diagram of a UE.

A configuration of the UE 100 (user terminal) according to the embodiment will be described, below. FIG. 6 is a block diagram of the UE 100. As illustrated in FIG. 6, the UE 100 includes a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130. The receiver 110 may include a first receiver unit configured to receive a radio signal in the licensed band, and a second receiver unit configured to receive a radio signal in the unlicensed band.

The transmitter 120 performs various types of transmissions under the control of the controller 130. The transmitter 120 includes an antenna and a transmitter unit. The transmitter unit converts a baseband signal (transmission signal) output from the controller 130 into a radio signal, and transmits the radio signal from the antenna. The transmitter 120 may include a first transmitter unit configured to transmit a radio signal in the licensed band, and a second transmitter unit configured to transmit a radio signal in the unlicensed band.

The controller 130 performs various types of controls in the UE 100. The controller 130 includes a processor and a memory. The memory stores a program executed by the processor, and information used for a process by the processor. The processor includes a baseband processor configured to perform modulation and demodulation, coding and decoding and the like on a baseband signal, and a CPU (Central Processing Unit) configured to execute the program stored in the memory to perform various types of processes. The processor may include a codec that performs coding and decoding on sound and video signals. The processor executes various types of processes described later, and various types of communication protocols described above.

Base Station

Figure 7:
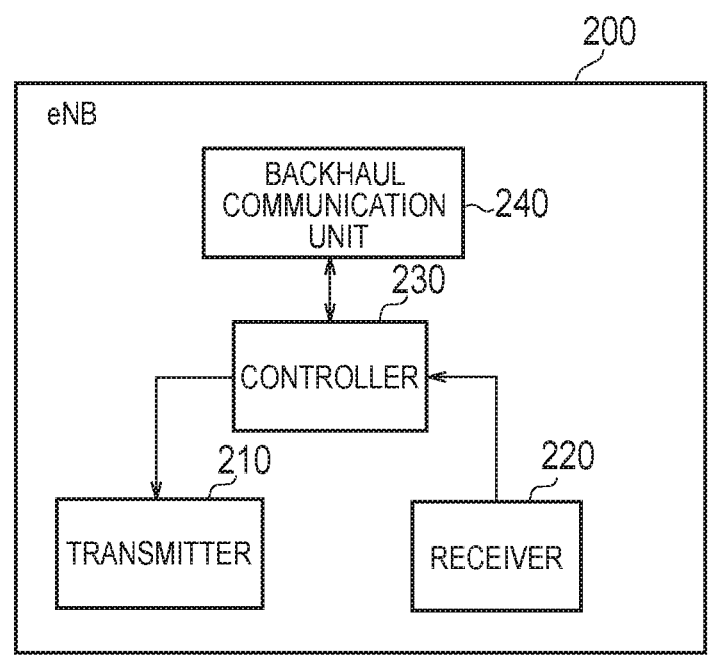
FIG. 7 is a block diagram of an eNB.

A configuration of the eNB 200 (base station) will be described, below. FIG. 7 is a block diagram of the eNB 200. As illustrated in FIG. 7, the eNB 200 includes a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmission signal) output from the controller 230 into a radio signal, and transmits the radio signal from the antenna. The transmitter 210 may include a first transmitter unit configured to transmit a radio signal in the licensed band, and a second transmitter unit configured to transmit a radio signal in the unlicensed band.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230. The receiver 220 may include a first receiver unit configured to receive a radio signal in the licensed band, and a second receiver unit configured to receive a radio signal in the unlicensed band.

The controller 230 performs various types of controls in the eNB 200. The controller 230 includes a processor and a memory. The memory stores a program executed by the processor, and information used for a process by the processor. The processor includes a baseband processor configured to perform modulation and demodulation, coding and decoding and the like on a baseband signal, and a CPU (Central Processing Unit) configured to execute the program stored in the memory to perform various types of processes. The processor executes various types of processes described later, and various types of communication protocols described above.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

First Embodiment

Hereinafter, a first embodiment will be described.

Data Transmission Timing of Downlink

If the LBT of the LBE scheme is applied to the downlink communication in the unlicensed band, the eNB 200 can start the data transmission from anywhere across the subframe, in addition to a case where the data transmission is performed from the beginning (boundary) of the subframe.

FIG. 8 is a diagram illustrating an example of a data transmission timing of the downlink according to the first embodiment. As illustrated in FIG. 8, the subframe is set with a plurality of candidate timings at which the eNB 200 can start the data transmission (PDSCH transmission). A symbol position of the candidate timings may be prescribed in advance by a system specification. FIG. 8 illustrates an example where four of candidate timings #1 to #4 are set.

However, the number of candidate timings set to one subframe is not limited to four. The number of candidate timings may be any number that is equal to or more than two and equal to or less than the number of symbols in the subframe.

As described above, the data transmission timing of the eNB 200 is decided in response to the LBT (CCA) result. The eNB 200 can transmit the data only when performing the CCA before the candidate timing and the LBE counter becomes zero, and thus, whether or not the data can be transmitted cannot be known until immediately before the candidate timing.

Furthermore, depending on from which candidate timing out of the candidate timings #1 to #4 the data transmission is started, data capacity (specifically, the number of resource elements) transmittable in one resource block (RB) differs.

Normally, the eNB 200 performs the resource allocation to the UE 100 in units of subframes. Therefore, a transmission parameter is determined by assuming the data capacity when performing the resource allocation to the UE 100 in units of subframes, and the transmission parameter is applied to generate transmission data. The transmission parameter is a transport block size (TBS) or a modulation and coding scheme (MCS) and the like.

Thus, if starting the data transmission from anywhere across the subframe, there is a concern that the eNB 200 cannot completely transmit the transmission data prepared beforehand in the subframe. Although it is conceivable to reduce the transmission data amount by reducing the redundant bits in the transmission data, if a coding rate exceeds one, it is impossible for the UE 100 to decode data without retransmission.

Operation of eNB 200 According to First Embodiment

The eNB 200 according to the first embodiment perform data transmission to the UE 100 by use of the unlicensed band. If starting the data transmission from anywhere across the subframe in response to the monitoring result (CCA result) of the unlicensed band, the eNB 200 determines a transmission parameter to be applied to the data transmission in the subframe in response to the start timing of the data transmission in the subframe. The transmission parameter includes at least one of a TBS, an MCS, a modulation scheme, and the number of RBs.

In the first embodiment, if starting the data transmission from anywhere across the subframe, the eNB 200 applies, to the data transmission, a second transmission parameter different from a first transmission parameter applied when performing the data transmission from the beginning of the subframe. Specifically, the eNB 200 applies different transmission parameters for each of the plurality of candidate timings set in the subframe (for example, timings #1 to #4 in FIG. 8) to generate the transmission data. It is noted that an operation according to the first embodiment described below may be performed only if a value of the LBE counter is decreased to a certain degree.

(1) Operation Pattern 1

In an operation pattern 1 according to the first embodiment, the eNB 200 applies different transmission parameters for each of the plurality of candidate timings to generate transmission data in advance, and maintains the generated transmission data in advance.

Normally, the transmittable data capacity is decided in response to the MCS used for the transmission and the amount of radio resource. For each of the plurality of the candidate timings, the eNB 200 estimates, based on the number of available resource elements, the data capacity, and sets the MCS to match with the data capacity in advance. In the example illustrated in FIG. 8, the eNB 200, for example, sets beforehand as follows: the candidate timing #1: MCS28, the candidate timing #2: MCS28, the candidate timing #3: MCS20, and the candidate timing #4: MCS17. Furthermore, the TBS for each candidate timing is set beforehand, based on the MCS set beforehand.

Moreover, for each of the plurality of the candidate timings, the eNB 200 applies the MCS and the TBS set beforehand to generate the transmission data in advance, and maintains the generated transmission data in a transmission buffer in advance. In the example illustrated in FIG. 8, the eNB 200 maintains four patterns of transmission data items in the transmission buffer in advance.

Thus, even if starting the data transmission from anywhere across the subframe, the eNB 200 can appropriately perform the data transmission to the UE 100.

(2) Operation Pattern 2

An operation pattern 2, unlike the operation pattern 1 in which the transmission data of each candidate timing is maintained in advance, is an operation pattern that generates the transmission data of each candidate timing as necessary.

In the operation pattern 2, if determining that the data transmission is not possible for one candidate timing out of a plurality of candidate timings, the eNB 200 generates transmission data corresponding to one subsequent candidate timing after the one candidate timing, after the determination.

FIG. 9 is a diagram for describing the operation pattern 2 according to the first embodiment. In FIG. 9, a case is assumed where a head of a first-half slot of the subframe (slot 0) is set as a candidate timing #1 and a head of a second-half slot of the subframe (slot 1) is set as a candidate timing #2.

As illustrated in FIG. 9, the eNB 200 fails in the LBT (CCA) before the first-half slot (slot 0) and determines that the data transmission cannot be started at the candidate timing #1. Until performing the LBT (CCA), the eNB 200 does not generate transmission data for the candidate timing #2.

After determining that the data transmission cannot be started at the candidate timing #1, the eNB 200 generates transmission data for the candidate timing #2. The transmission parameter applied to the transmission data (MCS and TBS) may be set beforehand by using a method similar to the operation pattern 1.

If succeeding in the LBT (CCA) before the second-half slot (slot 1) and determining that the data transmission can be started at the candidate timing #1, the eNB 200 starts the data transmission from the candidate timing #2.

In this manner, according to the operation pattern 2, a buffer load of the eNB 200 can be reduced compared to the operation pattern 1. Furthermore, if the LBT is succeeded at the candidate timing in a preceding step, data corresponding to the candidate timing in a following step does not need to be generated, and thus, a calculation load can be reduced.

(3) Operation Pattern 3

In an operation pattern 3, the eNB 200 fixes the MCS applied to the subframe while changing the TBS applied to the data transmission in response to the start timing of the data transmission in the subframe. The operation pattern 3 may be performed in combination with the operation pattern 1 or the operation pattern 2.

The eNB 200 may, for example, maintain a table (TBS table) in which a TBS, an MCS, the number of RBs, and a candidate timing are associated. The TBS table is prescribed by the specification and the UE 100 also maintains the same table.

Specifically, the amount of available radio resource is decided by the number of RBs and the candidate timing, and the transmittable data amount (that is, the TBS) is decided by the amount of radio resource and the MCS. The eNB 200 obtains, for each candidate timing, the TBS corresponding to the number of RBs and the MCS applied to the data transmission from the TBS table, and applies the obtained TBS to the data transmission.

Here, a following formula can be used for TBS calculation.

TBS after correction=original TBS*(frame length used for transmission in the subframe/subframe length)*correction term Alternatively, the TBS calculation may be achieved by virtually changing the number of RBs by the following formula.

The number of RBs after correction=actual number of RBs*(subframe length used for transmission in the subframe/subframe length)*correction term

(4) Operation Pattern 4

In an operation pattern 4, the eNB 200 fixes the TBS applied for the subframe while changing the modulation scheme applied to the data transmission in response to the start timing of the data transmission in the subframe. It is noted that the coding scheme applied to the subframe may also be fixed.

For example, the eNB 200 applies a QPSK if starting the transmission from the head of the subframe, and uses a 16 QAM if starting the transmission from anywhere across the subframe. Thus, the amount of data transmittable per RE can be changed.

According to the operation pattern 4, for each candidate timing, the modulation process after the coding process can be differentiated while having a common process up to the coding process, and thus, the increase in the process load can be suppressed.

(5) Operation Pattern 5

Figure 10A:
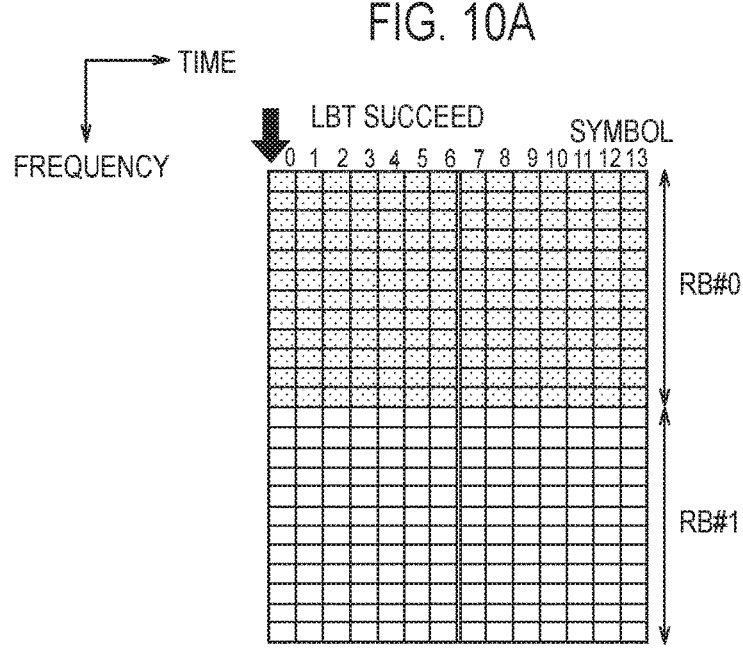
FIGS. 10A and 10B are diagrams for describing an operation pattern 5 according to the first embodiment.
Figure 10B:
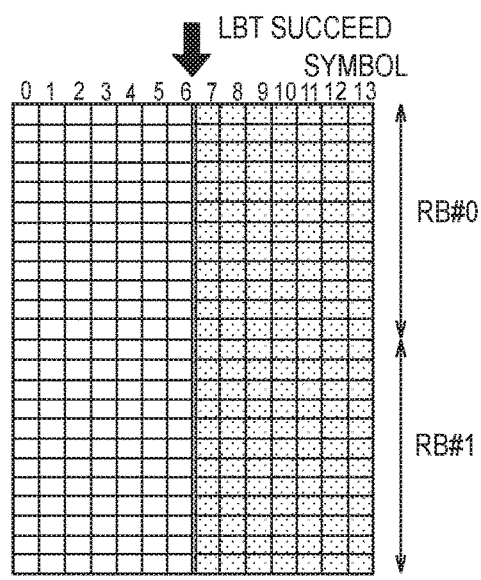

In an operation pattern 5, the eNB 200 changes the number of RBs applied to the data transmission in the subframe, in response to the start timing of the data transmission in the subframe. FIGS. 10A and 10B are diagrams for describing the operation pattern 5 according to the first embodiment.

As illustrated in FIGS. 10A and 10B, the eNB 200 assigns a plurality of RBs to the UE 100 in advance. FIGS. 10A and 10B illustrate an example where the eNB 200 assigns two RBs (RBs #0 and #1) to the UE 100.

Furthermore, the eNB 200 changes the number of RBs used per UE, in response to the timing of successful LBT. Specifically, the eNB 200 changes the number of RBs used per UE so that the number of resource elements used when performing transmission in an entire one subframe and the number of resource elements used when performing transmission in anywhere across the subframe are substantially equal to one another.

In the example illustrated in FIGS. 10A and 10B, if starting the transmission from the head of the second-half slot (FIG. 10B), the amount of time resource becomes a half compared to when starting the transmission from the head of the subframe (FIG. 10A). Thus, if starting the transmission from the head of the second-half slot (FIG. 10B), the amount of frequency resource is doubled. That is, the number of RBs when starting the transmission from the head of the subframe (FIG. 10A) is set to one, and the number of RBs when starting the transmission from the head of the second-half slot (FIG. 10B) is set to two.

Similarly, in the UE 100, the number of RBs applied to data reception in the subframe is changed, in response to the start timing of the data reception in the subframe. It is noted that the operation of the UE 100 side will be described in detail in a third embodiment.

In the operation pattern 5, if a specific signal different from the data (see third embodiment) is included in the head of the transmission data, the eNB 200 may adjust the data capacity by a rate matching.

It is noted that if starting the transmission from the head of the subframe (FIG. 10A), an unused RB #1 may be used for another UE 100.

Second Embodiment

A second embodiment will be described with a particular focus on a difference from the first embodiment, below.

The eNB 200 according to the second embodiment performs data transmission to the UE 100 in a burst transmission period over a plurality of subframes by use of the unlicensed band. If starting the data transmission from anywhere across the subframe in response to the monitoring result (CCA result) of the unlicensed band, the eNB 200 transmits, in a final subframe of the burst transmission period, data that cannot be completely transmitted in the subframe.

The UE 100 according to the second embodiment performs data reception from the eNB 200 in the burst transmission period over the plurality of subframes by user of the unlicensed band. If starting the data reception in anywhere across the subframe in response to the monitoring result of the unlicensed band in the eNB 200, the UE 100 receives data that cannot be completely received in the subframe in the final subframe of the burst transmission period.

Figure 11:
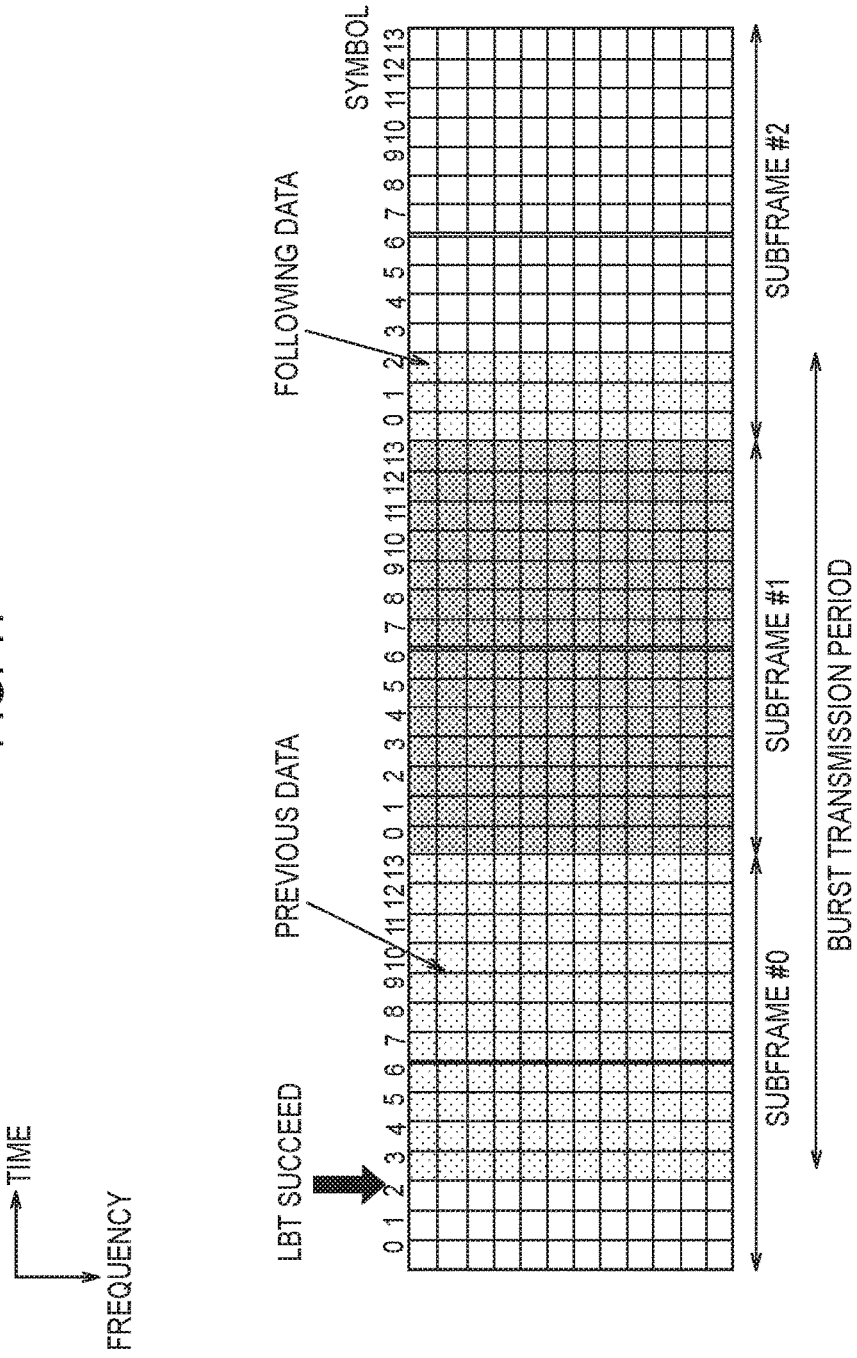
FIG. 11 is a diagram for describing an operation according to a second embodiment.

FIG. 11 is a diagram for describing an operation according to the second embodiment. FIG. 11 illustrates an example where the burst transmission period is a time length equivalent to two subframes.

As illustrated in FIG. 11, if succeeding in the LBT in anywhere across a subframe #0, the eNB 200 transmits transmission data prepared beforehand in a subframe #0 as much as possible. The transmission data prepared beforehand may be transmission data assumed to be transmitted from the beginning (head) of the subframe. In FIG. 11, the data transmitted in the subframe #0 is indicated as "Previous Data". Furthermore, the eNB 200 maintains the data that cannot be completely transmitted in the subframe #0 (Following Data), in the transmission buffer. The UE 100 maintains the "Previous Data" received from the eNB 200 in a reception buffer.

Next, in a subframe #1, the eNB 200 transmits, to the UE 100, normal transmission data that is not the "Following Data".

Then, in a subframe #2 that is the final subframe of the burst transmission, the eNB 200 transmits, to the UE 100, the "Following Data" maintained in the transmission buffer. The UE 100 performs a reception process after combining the "Previous Data" maintained in the reception buffer and the newly received "Following Data".

In this manner, according to the second embodiment, it is possible to further utilize the burst transmission period without waste, without changing the TBS.

Third Embodiment

A third embodiment will be described with a particular focus on a difference from the first embodiment and the second embodiment. The third embodiment is an embodiment mainly related to a notification to the UE 100 accompanying the operation of the first embodiment. As a notification method, there are methods of: performing notification to the UE 100 from the eNB 200 in the unlicensed band (SCell), and performing notification to the UE 100 from the eNB 200 in the licensed band (PCell) (so-called cross carrier scheduling (XCS)).

Method of Performing Notification in Unlicensed Band

In the third embodiment, if starting the data transmission from anywhere across the subframe, the eNB 200 transmits, at the head of the data, a specific signal different from the data transmitted to the UE 100. If starting the data reception from anywhere across the subframe, the UE 100 receives, at the head of the data, the specific signal different from the data. The specific signal includes at least one of a synchronization signal and downlink control information (DCI). The synchronization signal may include a primary synchronization signal (PSS) and a secondary synchronization signal (SSS). It is noted that the eNB 200 transmits the specific signal at the head of the data, only if starting the data transmission from anywhere across the subframe. Alternatively, the eNB 200 may transmit the specific signal at the head of the data, even if starting the data transmission from the head of the subframe.

Specific examples of the specific signal will be given below.

(1) PSS/SSS

Assuming that the UE 100 has already synchronized with the SCell, the UE 100 performs a reception process only if a PSS/SSS can be received. At this time, it may be either one of PSS/SSS. It is noted that by the PSS/SSS, the transmission start timing of the eNB 200 can be determined, but information included in the DCI (scheduling information and the like) cannot be transmitted. Therefore, it is necessary to be combined with signals described below (for example, combined with Initial signal) or to be set with a fixed value beforehand.

(2) PDCCH

As usual, the UE 100 performs determination, by a blind decoding of the PDCCH, whether the assignment is performed to the UE 100. Since there are a plurality of candidate timings, the blind decoding is performed at a plurality of locations, and thus, the process load of the UE 100 is large.

(3) EPDCCH (Enhanced PDCCH)

The UE 100 determines, based on reception of an EPDCCH, whether it is a reception timing of the data. Scheduling information and the like are included in the EPDCCH. A transmittable resource region changes in response to the transmission start timing, and thus, a resource region of the EPDCCH may be changed in response to the transmission start timing.

(4) Initial Signal

An "Initial Signal" includes information related to the serving cell. The information related to the serving cell is information such as a discovery reference signal (DRS) to a subordinate UE, and the transmission start/end timing. The information related to the serving cell may include information on the amount of future traffic of the eNB (the data amount in the buffer of the eNB 200). The eNB 200 includes information on a transmission start flag and the DCI (scheduling information and the like) into the "Initial Signal" to enable the data reception by the UE 100.

Method of Performing Notification in Licensed Band

The UE 100 according to the third embodiment receives the downlink control information (DCI) from the eNB 200. If starting the data reception in anywhere across the subframe, the UE 100 modifies the downlink control information in response to the start timing of the data reception in the subframe, and uses the modified downlink control information for the data reception.

Alternatively, the eNB 200 according to the third embodiment notifies the UE 100 of transmission parameters of each of the plurality of candidate timings by use of the licensed band.

Specific examples of a method of performing notification in the licensed band will be described, below.

(1) Method of Changing MCS Only by Fixed Value in Response to Data Transmission Start Timing Similarly to the conventional method, the DCI information is transmitted to the UE 100 from the PCell. The eNB 200 and the UE 100 changes a setting value only by a fixed value determined beforehand, in response to the data transmission start timing. For example, a regulation is prescribed in advance that if starting the transmission from the head of the second-half slot, the MCS is lowered by five. The UE 100 detects the data transmission start timing by the specific signal (for example, PSS/SSS) from the SCell (unlicensed band).

(2) Method of Selecting MCS According to Reduction Rate of Number of REs

Similarly to the conventional method, the DCI information is transmitted to the UE 100 from the PCell. The eNB 200 and the UE 100, in response to reduction ratio of the number of REs according to the data transmission start timing, determines and applies a largest MCS not exceeding the original coding rate to enable reception without requiring an additional DCI information. It is noted that it may not be limited to the "largest MCS not exceeding the original coding rate" but may be a "largest MCS equal to or smaller than the original coding rate", a "smallest MCS exceeding the original coding rate", or a "smallest MCS equal to or larger than the original coding rate".

Furthermore, when calculating these coding rates, an overhead due to a reference signal, a control signal, and the like (that is, the RE not available for PDSCH) may be taken into account. Specifically, the coding rate is calculated based on "(subcarrier number)×(OFDM symbol number)−(overhead)".

Alternatively, when calculating these coding rates, the overhead due to the reference signal, control signal, and the like (RE not available for PDSCH) may not be taken into account. Specifically, the coding rate is calculated based on "(subcarrier number)×(OFDM symbol number)".

(3) Method of Including Transmission Parameter for Each Candidate Timing Into XCS The eNB 200 includes the transmission parameter for each candidate timing into the DCI information, and then the UE 100 can obtain reception setting information for all timings from the PCell. The UE 100 detects the data transmission start timing by the specific signal (for example, PSS/SSS) from the SCell (unlicensed band).

Modifications of First Embodiment to Third Embodiment

In the above-described embodiments, the eNB 200 determines a transmission parameter applied to data transmission, in response to the start timing of data transmission in a subframe. Furthermore, the eNB 200 may determine a transmission parameter applied to the data transmission, in response to the end timing of the data transmission. Specifically, the end timing is set in the subframe in the final subframe of the burst transmission length such as in the second embodiment. Thus, the modification of the transmission parameter according to the above-described embodiments is also valid for such final subframe.

In the above-described embodiments, retransmission (HARQ retransmission) has not been particularly described. However, an ingenuity is required for retransmission if using only from anywhere across the subframe to the last part thereof to perform transmission (hereinafter, "partial subframe transmission") without performing transmission from the head of the subframe. The retransmission in the above-described embodiments uses transmission methods (A) to (C) described below.

(A) During the retransmission, transmission is performed after a rate matching to match with a next allocation resource size without changing the TBS.

(B) During the retransmission, if an allocation resource amount is larger during the retransmission, transmission is performed with the same allocation resource amount as at the time of initial transmission. A remaining resource may be used for an allocation for another UE. Therefore, the DCI including information on the transmission start timing and/or the transmission end timing may be introduced. Such DCI may be applied not only to the partial subframe transmission but also to the normal data transmission.

(C) During the initial transmission, if starting the transmission from the head of the subframe, it is controlled so that the transmission starts from the head of the subframe even at the time of retransmission.

In the above-described embodiments, the DCI described below may be introduced.

Specifically, the DCI includes information indicating whether or not it is the partial subframe transmission. The UE 100 performs a search at a transmission start timing in which the partial subframe transmission may be possible, only if the partial subframe transmission is indicated in the DCI.

In the above-described embodiments, a method of collectively assigning a plurality of (consecutive) subframes (hereinafter referred to as "multi-subframe scheduling") has not been particularly described. If it is the multi-subframe scheduling, the eNB 200 may transmit the DCI for the plurality of subframes. Although not basically different from the information such as the number of RBs and the MCS (scheduling information), the DCI for the plurality of subframes may be applied with a method in which a new data index (NDI), a redundant version (RV), and an HARQ process ID are separately transmitted, are collectively transmitted at the head, or have an instruction and regularity at the head. Furthermore, the MCS may be transmitted only when the MCS changes. The number of RBs may also be transmitted only when the number of RBs changes (RB can be modified easily in DL, but difficult in UL.). Furthermore, although only the number of RBs has been described above, the DCI may include a setting that may change intervals when performing assignment in the subcarrier spaced out at even intervals as explained during the course.

Fourth Embodiment

A fourth embodiment will be described with a particular focus on a difference from the first embodiment to the third embodiment. In the first embodiment to the third embodiment, operations when starting the data transmission from anywhere across the subframe has been described; however, a case has been assumed where the data transmission is started from the head of the symbol interval in the subframe. In the fourth embodiment, an operation for starting the data transmission from anywhere across the symbol interval in the subframe will be described.

The eNB 200 according to the fourth embodiment uses the unlicensed band to perform data transmission to the UE 100. The eNB 200 includes a controller 230 configured to determine whether or not the data transmission can be started, in response to the monitoring result (CCA/LBT result) of the unlicensed band. If the timing for determining that the data transmission can be started is in anywhere across the symbol interval, the controller 230 starts the data transmission from the timing in anywhere across the symbol interval, without waiting for a head of the next symbol interval. Hereinafter, a timing at which the LBT is succeeded is referred to as "LBT success timing".

Here, if the LBT success timing is in anywhere across the symbol interval, and if holding off the start of the data transmission until the head of the next symbol interval, another device may succeed in the LBT and start the data transmission during the waiting time. That is, an interruption by another device may occur. Thus, by starting the data transmission from the LBT success timing in anywhere across the symbol interval without waiting for the head of the next symbol interval, the interruption by another device can be prevented.

Figure 12:
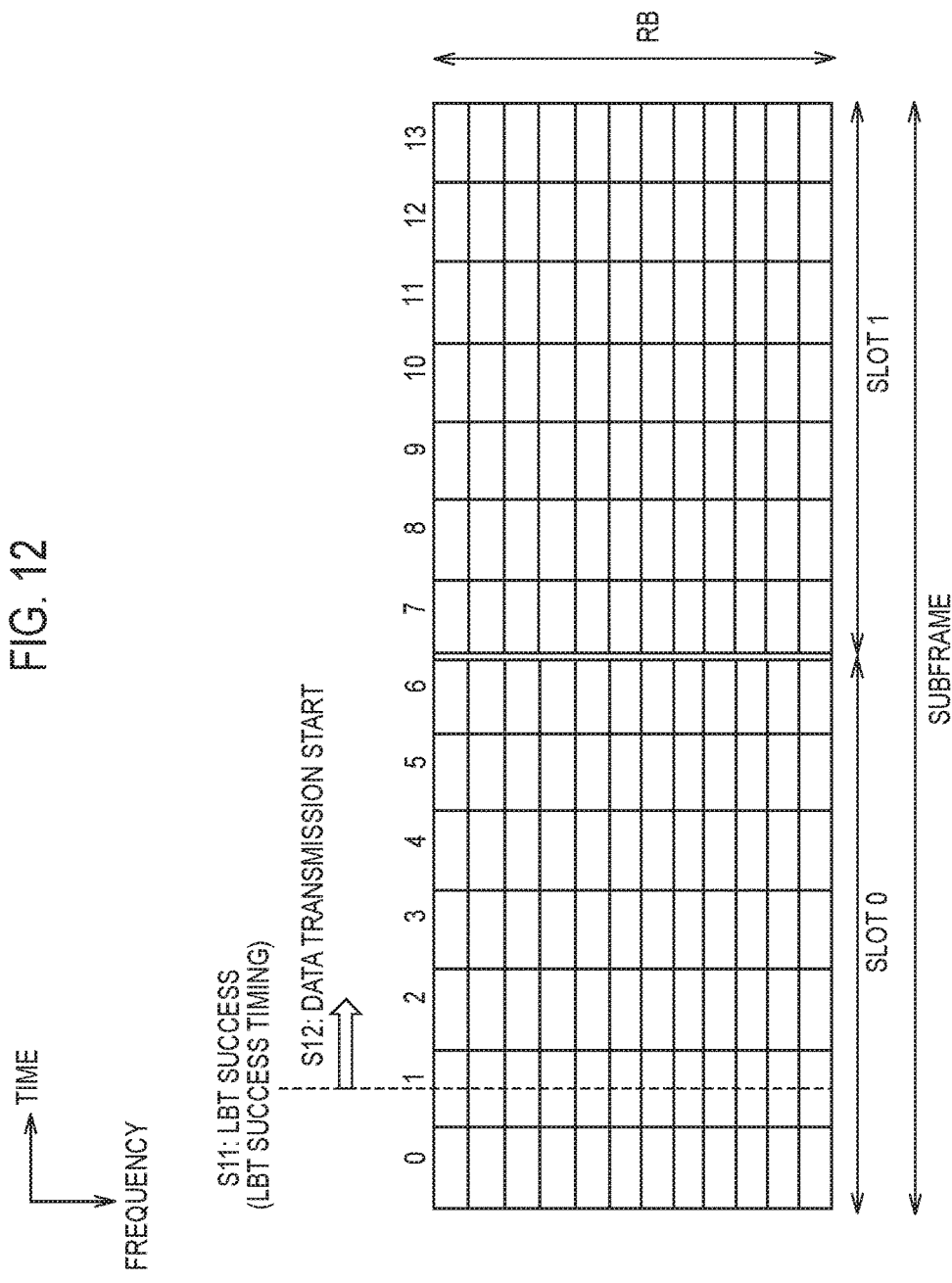
FIG. 12 is a diagram for describing an operation according to a fourth embodiment.

FIG. 12 is a diagram for describing an operation example of the eNB 200 according to the fourth embodiment. As illustrated in FIG. 12, the eNB 200 succeeds in the LBT in anywhere across the symbol interval in the subframe, and determines that the data transmission can be started (step S11). FIG. 12 illustrates an example where the eNB 200 succeeds in the LBT at a timing in anywhere across a symbol interval "1". If the LBT success timing is in anywhere across the symbol interval "1", the eNB 200 starts the data transmission from the LBT success timing in anywhere across the symbol interval "1" without waiting for a head of a next symbol interval "2" (step S12). Specifically, the eNB 200 starts the data transmission from the LBT success timing in anywhere across the symbol interval "1" without performing a process of transmitting a reservation signal until the head of the next symbol interval "2". The overhead can be reduced and the resource utilization efficiency can be raised, by performing transmission of user data instead of transmission of the reservation signal (that is, a dummy data).

The UE 100 establishes a symbol synchronization with the eNB 200, based on a reference signal transmitted by the eNB 200. The reference signal is, for example, a cell-specific reservation signal (CRS) or a discovery reference signal (DRS) transmitted separately from the data by the eNB 200. If the eNB 200 starts the data transmission from anywhere across the symbol interval, data reception is performed at a timing deviated from a symbol timing based on the CRS/DRS. If the deviation amount is small, the UE 100 can perform the data reception. Alternatively, the eNB 200 may transmit a DRS or a DMRS (Demodulation Reference Signal) together with the data. The UE 100 establishes the symbol synchronization based on the DRS or the DMRS, and thus, the UE 100 can perform the data reception even if the deviation is large.

It is noted that the eNB 200 may continue the data transmission according to a normal LTE timing, in the subframe subsequent to the subframe in which the data transmission has been started. In this case, there may be a blank time period in the final symbol interval "13" of the subframe in which the data transmission has been started. To prevent the interruption by another device, it is preferable that the eNB 200 transmits a predetermined signal over the blank period in the final symbol interval "13". For example, the eNB 200 inserts an additional cyclic prefix (CP) at the end of the symbol transmitted in the symbol interval "13".

Figure 13:
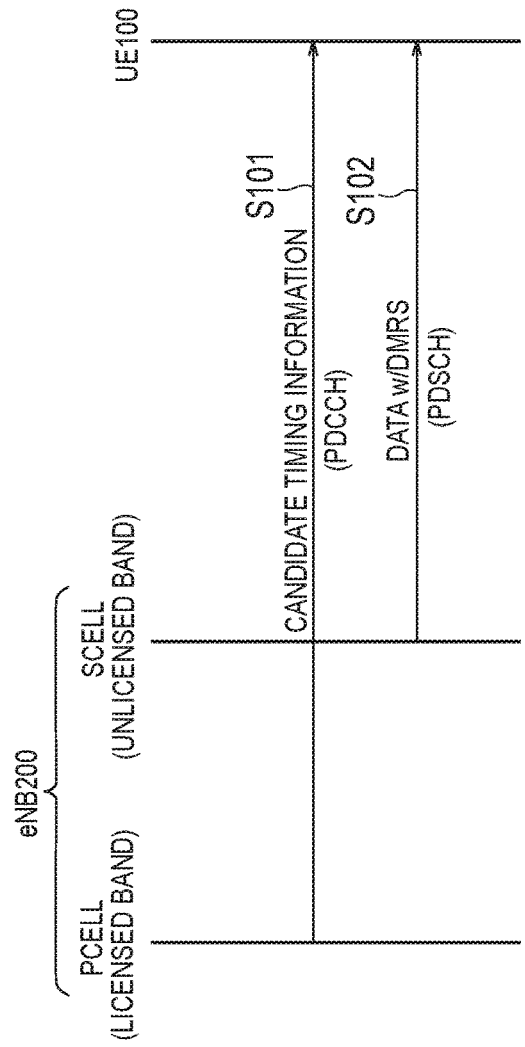
FIG. 13 is a sequence diagram illustrating an operation example according to the fourth embodiment.

FIG. 13 is a sequence diagram illustrating an operation example according to the fourth embodiment. In FIG. 3-13, a cell of the licensed band is set as a PCell to the UE 100, and a cell of the unlicensed band is set as an SCell to the UE 100. Here, an example will be described where the resource allocation is performed to the UE 100 from the PCell by cross carrier scheduling. It is noted that a case is assumed where timing synchronization has been established between the PCell and the SCell.

As illustrated in FIG. 13, in step S101, the eNB 200 transmits the DCI from the PCell to the UE 100 by the cross carrier scheduling. The DCI includes candidate timing information indicating a symbol interval with a possibility that the eNB 200 starts the data transmission. The symbol interval with a possibility that the eNB 200 starts the data transmission may be determined based on an LBE counter status. Alternatively, the eNB 200 may determine a plurality of symbol intervals in the subframe as candidate timings and start the data transmission from any one of the plurality of candidate timings. In this case, the candidate timing information indicates the plurality of symbol intervals (plurality of candidate timings). The UE 100 receives the DCI including the candidate timing information from the PCell. It is noted that the transmission and reception of the candidate timing information may be performed by the RRC signaling instead of the DCI.

In step S102, the eNB 200 (SCell) succeeds in the LBT in anywhere across the symbol interval that has been notified to the UE 100, and starts the data transmission from the LBT success timing in anywhere across the symbol interval. For example, the eNB 200 (SCell) transmits, to the UE 100, user data to which the DMRS is added. The UE 100 performs a full search in the symbol interval (candidate timing) indicated by the candidate timing information in the time direction, to start the data reception from the SCell.

Other Embodiments

The above-described first embodiment to fourth embodiment may be performed separately and independently, and may also be performed by combining two or more embodiments. For example, a process related to the candidate timing information according to the fourth embodiment may be applied to the first embodiment to the third embodiment.

In the above-described embodiments, an example where an identical eNB 200 manages the cell #1 (licensed band) and the cell #2 (unlicensed band) has been described. However, the present disclosure can be also applied to a case where different eNBs 200 manage the cell #1 (licensed band) and the cell #2 (unlicensed band).

Although downlink transmission has been mainly described in the above-described embodiments, the operations according to the above-described embodiments may also be applied to uplink transmission. Specifically, if the UE 100 uses an unlicensed band to perform data transmission to the eNB 200 (that is, uplink data transmission), at least some of the operations according to the above-described embodiments is applicable to the uplink data transmission.

In the above-described embodiments, the LTE system has been exemplified as the mobile communication system. However, the present disclosure is not limited to the LTE system. The present disclosure may be applied to systems other than the LTE system.

Additional Statement 1

1. Introduction

In RAN1#80 meeting and LAA Adhoc, functionalities for discontinuous LAA downlink transmission were discussed and the following agreements were made.

Agreements:
Functions that can be supported by one or more signals to be transmitted from the beginning of a discontinuous LAA downlink transmission can include at least one of the following
AGC setting
Channel reservation
Note: Transmission of the signal(s) may not be required
At least functions that may need to be supported for discontinuous LAA downlink transmission operation by one or more signals include at least one of the following
Detection of the LAA downlink transmission (including cell identification)
Time & frequency synchronization
Other functionalities if necessary
Note that it is not precluded the same signal is used for all above and possibly other functions. The above functionalities can be supported by other methods (including assistance from licensed carrier).
Agreements:
LAA supports transmitting PDSCH when not all OFDM symbols are available for transmission in a subframe according to LBT, also support delivering necessary control information for the PDSCH.

It is further for study about starting/ending OFDM symbols of the PDSCH.

In the present additional statement, we discuss the LAA Frame structure including the flexible transmission and the reservation signal.

2. Flexible Transmission Design

For category 3 & 4 LBT, the flexible transmission is needed. As described in several contributions, we support the start position of PDSCH transmission should be pre-defined symbols in a subframe because it reduces the receiver complexity at the UE and the encoding delay at the eNB. Regarding TBS determination, eNB should change TBS corresponding to the start point except for the floating TTI model. If TBS has a fixed number of allowed sizes, then the eNB can start channel coding in advance. This can also be adapted for the ending OFDM symbols.

Proposal 1: For category 3 & 4 LBT except for floating TTI model, TBS determination should partially depends on the start time and the ending time.

3. Indication of the Start and End Time of PDSCH

We believe an initial signal is needed at least for the synchronization purpose. The initial signal can also be used as the indication of the start time of the PDSCH.

Additionally, the initial signal can indicate or imply the end time with respect to the start time.

Proposal 2: The initial signal should indicate or imply the start and the end time information.

4. Reservation Signal Design

Figure 14:
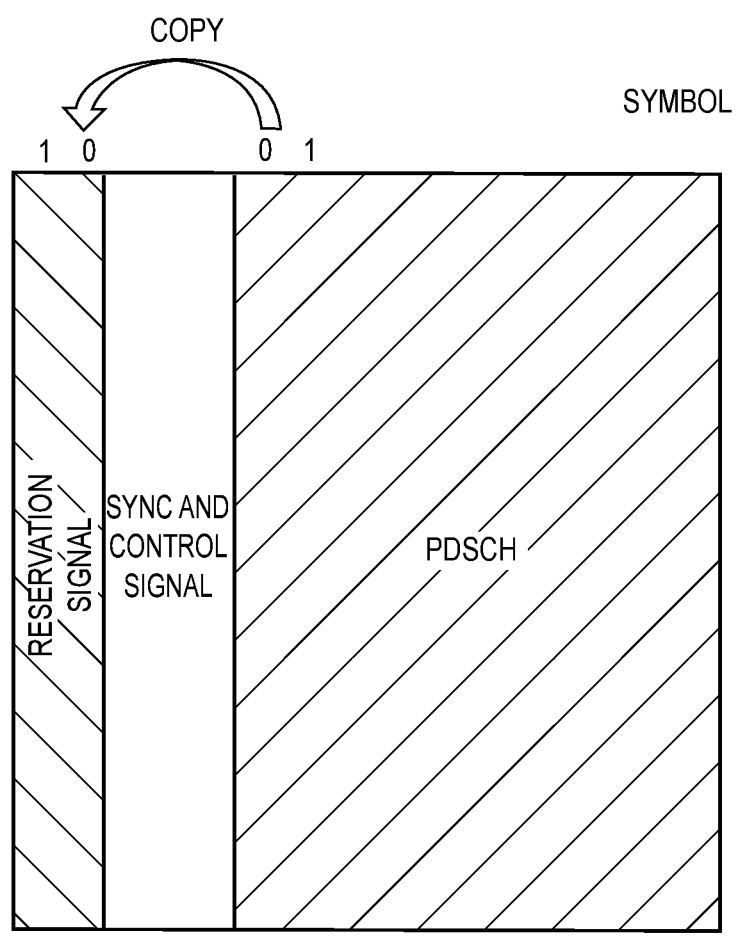
FIG. 14 is a diagram according to an additional statement of an embodiment.

For category 3 & 4 LBT, reservation signal is needed when the start symbol of PDSCH is fixed to several pre-defined symbols in a subframe. In such a case the reservation signal cannot consist of essential control signaling because the transmission of this reservation signal is opportunistic (for example, the transmission begins at the subframe boundary). Considering the above we believe the duration of the reservation signal should be as short as possible. In addition, we propose to use the copy of a portion of PDSCH as the reservation signal to utilize this period more effectively as shown in FIG. 14 when the reservation signal is longer than one symbol. FIG. 14 illustrates an example of reservation signal. This signal is useful for the improvement of the PDSCH performance. In case this signal is shorter than one symbol, other signal should be inserted. One possible example is transmitting a signal indicating it is a "LTE-LAA" transmission. This can be used for CCA threshold adaptation.

Proposal 3: The copy of PDSCH can be considered as one of the candidates for the reservation signal when the reservation signal is longer than one symbol.

5. Consideration of LAA Scheduling

Due to LBT requirement the transmitter needs to perform CCA every time it wants to transmit data. Therefore, to reduce the CCA related overhead, the transmitter should strive for continuous transmission and avoid any in-between gaps. This is especially important for the UL transmissions.

In addition to the above, CCA overhead reduction, we should consider the control channel impact on the licensed carrier as well. In order to obtain an efficient usage of the licensed-carrier, the multi-subframe scheduling indicated by one DCI can also be considered. To support multi-subframe scheduling all the related DCI parameters such as the multiple NDIs, RVs, process IDs must be studied.

Proposal 4: Multi-subframe scheduling should be considered for LAA.

Additional Statement 2

1. Introduction

RAN1 has discussed functionalities for LAA and reached the following agreements.

Agreements:
Followings are updated agreements (bold fonts are updated points) from LAA ad-hoc meeting.
DRS design should allow DRS transmission on an LAA SCell to be subject to LBT.
Consider the following 2 options for the transmission of DRS within a DMTC window if LBT is applied to DRS:
Alt1: Subjected to LBT, DRS is transmitted in fixed time position within the configured DMTC.
Alt2: Subject to LBT, allow the DRS to be transmitted in at least one of different time positions within the configured DMTC.
Note: The number of different time positions should be restricted.
Note: One possibility is one time position in the subframe.
Modifications to Rel-12 DMTC configuration are FFS.
Note: this does not preclude the possibility to allow other DRS transmissions outside of the configured DMTC In the present additional statement, we discuss details of the DRS design.

2. DRS Transmission and LBT Scheme

At the previous meeting, RAN1 discussed DRS transmission and agreed on Alt1 and Alt2 for the case where LBT is applied. In this section, we discuss these two alternatives and the LBT method for DRS transmission.

In the Alt1 case the impact on the specification and the UE's receiver complexity are negligible because UE can just follow the DMTC. Additionally DRS is used as broadcast signals/information which is always received by all the serving (and the non-serving) UEs and the fixed opportunity of the transmission timing is beneficial. If transmission timing is not fixed, UE needs to search the DRS timing for every transmission resulting in higher power consumption. On the other hand, Alt.1 does not allow achieving an adequate synchronization accuracy and/or necessary RRM measurement may not be available when the LBT doesn't succeed for a long period of time. It causes severe impact on data reception and/or RRM functionality.

In the Alt2 case the UE can maintain synchronization accuracy and RRM measurement availability when the DRS transmitted is transmitted at different time position(s) even when the LBT doesn't succeed within the fixed time position(s).

If Alt2 is applied, it increases the UE complexity to search for the multiple time position(s) configured by enhanced DMTC. Furthermore, UE may need to be aware of the DRS subframes for RRM measurement (e.g. replica sequence generation based on subframe/slot number, estimation of the next DRS occasion, etc.).

Above discussion is summarized in Table.1. The table.1 shows comparison between Alt1 and Alt2. In our opinion, Alt1 is preferred to avoid increase in UE complexity and higher power consumption if the synchronization accuracy and the RRM measurement requirements are met with or without any enhancements. RAN1 should evaluate Alt1's impact on synchronization and RRM measurement, and ask RAN4 for the corresponding requirements if needed.

Proposal 1: RAN1 should evaluate Alt1's impact on synchronization and RRM measurement, and ask RAN4 for the corresponding requirements if needed. RAN1 should consider possible enhancements to the Alt1.

TABLE 1

|  | Advantage | Disadvantage |
|---|---|---|
| Alt1 | Low UE complexity and power consumption<br>Small specification impact | Higher Synchronization inaccuracy<br>Low RRM measurement availability |
| Alt2 | Higher Synchronization accuracy<br>High RRM measurement availability | High UE complexity and power consumption<br>Large specification impact including additional subframe number information |

One of the possible enhancements is to allow multiple DRS transmissions within multiple subchannels if the subchannel is not busy i.e., LBT is successful. (e.g. 20 MHz, 2×10 MHz, 4×5 MHz). This is beneficial since the channel conditions for every subchannel is different (e.g. unused RBs in DL/UL, UL transmission from far-UE).

Proposal 2: RAN1 should consider both the time domain and the frequency domain based enhancements.

3. Physical Design of LAA DRS

In our view, the following information should be transmitted by LAA SCells in the LAA DRS.
PSS/SSS/CRS/(CSI-RS)
Control information
Beacon According to the RAN1 agreement, LAA DRS should at least support the RRM measurement. Therefore, LAA DRS should include PSS/SSS/CRS for fulfilling this requirement.

Figure 15:
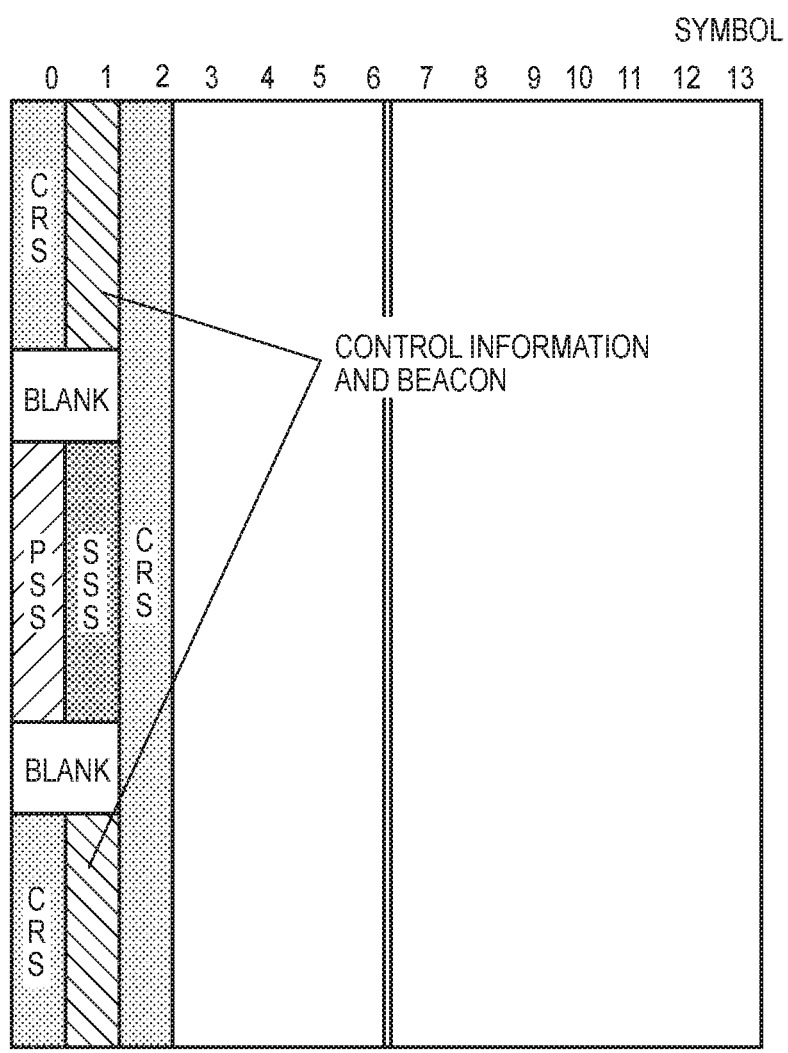
FIG. 15 is a diagram according to an additional statement of an embodiment.

For the unlicensed band, there is the European regulation about the Occupied Channel Bandwidth. According to the regulation, more than or equal to 80% of resources within an OFDM symbol should be filled by some signals if the system bandwidth is less than or equal to 40 MHz. The DRS includes the synchronization signals (PSS/SSS) occupying only 1.4 MHz (6 RB) in the center of the system bandwidth and any signals transmitted on the other resources are not specified explicitly. Therefore, there could be waste of system bandwidth in the wider system bandwidth deployments, which is not allowed by the regulation. One of the possible solutions is expanding the synchronization signals in frequency domain (e.g. correspond to system bandwidth). However, this solution significantly impacts the specification and increases the UE complexity (for example, detection of various synchronization signal sizes, etc.). In our view, RAN1 should discuss other approaches such as filling the unused resources with specific signals as shown in FIG. 15. FIG. 15 illustrates an example of DRS Physical design. Specific signals should be arranged to cover almost all the remaining bandwidth in the OFDM symbol with certain density to avoid potential miss detection in CCA by other devices (e.g. WiFi) due to low power density in the OFDM symbol.

Proposal 3: RAN1 should reuse the current synchronizations signals for LAA DRS and discuss to fill in the blank resources with some specific signals.

Control information provides the LAA cell information which includes at least resource mapping information and PLMN ID. In addition, subframe number and subset of SFN are used at least for the Alt2 DRS transmission to confirm the current subframe number and subset of SFN. If current subframe number and subset of SFN are corresponding to the fixed subframe configured via DMTC by serving Cell, UE can become aware that the received DRS was transmitted at the fixed subframe. In the Alt1 case, the subframe number and subset of SFN may not be needed.

Resource mapping information provided on the Control information indicates PDSCH resource allocation information when DRS transmission occurs simultaneously with PDSCH transmission. In our view, cell(s) should simultaneously transmit PDSCH and DRS when PDSCH transmission is scheduled in the same subframe as DRS occasion.

Proposal 4: LAA DRS subframes should include the Control information which provides the LAA cell information.

Beacon includes the information, which is related to spectrum usage, used by the neighboring cells. The neighboring LAA cells can detect the beacon and then select an appropriate channel to be used in their own LAA cells taking this information into account. The content of beacon could be related to the traffic load of unlicensed spectrum, the number of LBT failures and/or the number of the carriers used.

Proposal 5: LAA DRS subframes should include the Beacon which includes the information, which is related to spectrum usage, used by neighboring cells.

What is claimed is:

1. A base station configured to perform transmission to a user terminal by use of an unlicensed band, comprising:
    a controller configured to start the transmission from a boundary of a subframe, but also to start the data transmission from a second-half slot out of a first-half slot and the second-half slot which configure a subframe, wherein
    the controller is configured to transmit downlink control information in the second-half slot to start the transmission from the second-half slot,
    the controller is configured to change a modulation scheme to be applied to the transmission, depending on a start timing of the transmission, while fixing a transport block size applied to the subframe, and
    the downlink control information is a PDCCH or an EPDCCH.

2. The base station according to claim 1, wherein the controller is configured to notify, by RRC signaling, the user terminal of candidate timing information indicating a symbol interval in which the transmission starts from the second-half slot.

3. The base station according to claim 1, wherein
    the controller is configured to determine, if starting the transmission from the second-half slot depending on an monitoring result of the unlicensed band, a transmission parameter to be applied to the transmission depending on a start timing of the transmission in the subframe, wherein
    the transmission parameter includes at least one of a transport block size, a modulation and coding scheme, a modulation scheme, and a number of resource blocks.

4. The base station according to claim 1, wherein if starting the transmission from the second-half slot, the controller is configured to apply, to the transmission, a second transmission parameter different from a first transmission parameter applied when performing the transmission from the first-half slot.

5. The base station according to claim 1, wherein a plurality of candidate timings at which the transmission can be started is set to the subframe, wherein
the controller is configured to apply a different transmission parameter to each of the plurality of candidate timings to generate transmission data.

6. The base station according to claim 5, wherein the controller is configured to apply a different transmission parameter to each of the plurality of candidate timings to generate transmission data in advance, and hold the generated transmission data in advance.

7. The base station according to claim 5, wherein if determining that the transmission is not possible for one candidate timing out of the plurality of candidate timings, the controller is configured to generate, after the determination, transmission data corresponding to a candidate timing following the one candidate timing.

8. The base station according to claim 5, wherein the controller is configured to use a licensed band to notify the user terminal of a transmission parameter of each of the plurality of candidate timings.

9. The base station according to claim 1, wherein the controller is configured to change, while fixing a modulation and coding scheme applied to the subframe, a transport block size to be applied to the transmission, depending on a start timing of the transmission.

10. The base station according to claim 1, wherein the controller is configured to perform, if starting the transmission from the second-half slot, a process of transmitting a certain signal different from the data transmitted to the user terminal at a head of the data, and
the certain signal includes the downlink control information.

11. A user terminal configured to perform reception from a base station by use of an unlicensed band, comprising:
a controller configured to starting the reception from a second-half slot out of a first-half slot and the second-half slot which configure a subframe, wherein
the controller is configured to monitor downlink control information in the second-half slot to start the reception from the second-half slot,
the controller is configured to change a modulation scheme to be applied to the reception, depending on a start timing of the reception, while fixing a transport block size applied to the subframe, and
the downlink control information is a PDCCH or an EPDCCH.

12. The user terminal according to claim 11, wherein
the controller is configured to start stores, a second regulation for determining a modulation scheme used when starting the reception from the anywhere across the subframe, separately from a first regulation for determining a modulation scheme used when starting the reception from the second-half slot, and
the controller is configured to determine, based on the second regulation, a modulation scheme applied to the reception, in response to starting the reception from the second-half slot.

13. A processor for controlling a base station configured to perform reception from a base station by use of an unlicensed band, the processor comprising:
a memory communicatively coupled to the processor and including instructions, such that when executed by the processor performs the processes of:
starting the reception from a second-half slot out of a first-half slot and the second-half slot which configure a subframe;
monitoring downlink control information in the second-half slot to start the reception from the second-half slot; and
changing a modulation scheme to be applied to the reception, depending on a start timing of the reception, while fixing a transport block size applied to the subframe, wherein
the downlink control information is a PDCCH or an EPDCCH.

14. A communication method, comprising:
transmitting, by a base station configured to perform transmission to a user terminal by use of an unlicensed band, downlink control information in a second-half slot out of a first-half slot and the second-half slot which configure a subframe to start the transmission from the second-half slot;
monitoring, by the user terminal configured to perform reception from the base station by use of the unlicensed band, the downlink control information in the second-half slot to start the reception from the second-half slot;
changing, by the base station, a modulation scheme to be applied to the transmission, depending on a start timing of the transmission, while fixing a transport block size applied to the subframe; and
changing, by the user terminal, a modulation scheme to be applied to the reception, depending on a start timing of the reception, while fixing a transport block size applied to the subframe, wherein
the downlink control information is a PDCCH or an EPDCCH.

* * * * *